United States Patent
Liang et al.

(10) Patent No.: US 9,614,429 B2
(45) Date of Patent: Apr. 4, 2017

(54) SYSTEM FOR CONVERTING AC ELECTRICAL POWER TO DC ELECTRICAL POWER AND METHODS

(71) Applicant: ABB Technology Ltd., Zürich (CH)

(72) Inventors: Jiaqi Liang, Cary, NC (US); Li Qi, Cary, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/828,882

(22) Filed: Aug. 18, 2015

(65) Prior Publication Data

US 2017/0054358 A1    Feb. 23, 2017

(51) Int. Cl.
*H02M 1/12* (2006.01)
*H02M 7/06* (2006.01)

(52) U.S. Cl.
CPC ............. *H02M 1/12* (2013.01); *H02M 7/064* (2013.01)

(58) Field of Classification Search
CPC .................................................. H02M 1/126
See application file for complete search history.

(56) References Cited

U.S. PATENT DOCUMENTS

| | | | |
|---|---|---|---|
| 7,462,954 B2 | 12/2008 | Kraus | |
| 7,602,625 B2 | 10/2009 | Belson et al. | |
| 8,027,180 B2 * | 9/2011 | Nakagawa | H02P 9/48 363/132 |
| 8,416,595 B2 * | 4/2013 | Hasler | H02J 3/1857 323/208 |
| 8,971,068 B2 * | 3/2015 | Pu | H02M 1/126 363/44 |
| 9,231,406 B2 * | 1/2016 | Chen | H02J 3/01 |
| 2006/0284489 A1 | 12/2006 | Gross et al. | |
| 2010/0141039 A1 | 6/2010 | Belady et al. | |
| 2011/0148213 A1 | 6/2011 | Baldwin et al. | |
| 2012/0056481 A1 | 3/2012 | Corhodzic et al. | |
| 2015/0029771 A1 | 1/2015 | Hartmann et al. | |

FOREIGN PATENT DOCUMENTS

WO    20120163841 A1    12/2012

OTHER PUBLICATIONS

H. Midavaine, et al., "Multilevel Three-Phase Rectifier With Sinusoidal Input Currents", IEEE Power Electronics Specialists Conference, Jun. 1996, pp. 1596-1600.
B. Singh, et al., "A Review of Three-Phase Improved Power Quality AC-DC Converters", IEEE Transactions on Industrial Electronics, vol. 5, No. 3, Jun. 2004, pp. 641-660.
H. Kanaan, et al., "Three-Phase Current-Injection Rectifiers", IEEE Industrial Electronics Magazine, Sep. 2012, pp. 24-40.

(Continued)

*Primary Examiner* — Emily P Pham
(74) *Attorney, Agent, or Firm* — Taft Stettinius & Hollister LLP

(57) ABSTRACT

A system includes a first DC rail and a second DC rail, and a rectifier coupled with the first and second DC rails. A multilevel converter is also coupled with the DC rails and operable to limit input current harmonics to the rectifier. Differences between voltage phase and current phase in AC electrical power supplied to the system are compensated via closed loop control of a voltage output of the multilevel converter.

20 Claims, 4 Drawing Sheets

(56) References Cited

OTHER PUBLICATIONS

H. Yoo, et al., "A New Circuit Design and Control to Reduce Input Harmonic Current for a Three-phase AC Machine Drive System Having a Very Small DC-link Capacitor", IEEE, Feb. 2010, pp. 611-618.
U. ITOh, et al., "A Novel Three-Phase PFC Rectifier Using a Harmonic Current Injection Method", IEEE Transactions on Power Electronics, vol. 23, No. 2, Mar. 2008, pp. 715-722.
J. Kolar, et al., "The Essence of Three-Phase PFC Rectifier Systems—Part I", IEEE Transactions on Power Electronics, vol. 28 No. 1, Jan. 2013, pp. 176-198.
Rasmussen, Neil, "The Different Types of UPS Systems", Data Center Science Center, Jan. 2011, 10 pgs.
Rasmussen, Neil et al, "A Quantitative Comparison of High Efficieny AC vs DC Power Distribution for Data Centers", Data Center Science Center, Jan. 2012, 21 pgs.
De Jong, E.C.W. et al. "DC Power Distribution for Server Farms", Leonardo Energy, available at http://www.leonardo-energy.org/resources, Sep. 20, 2007, Sep. 20, 2007, 14 pgs.
Noritake, Masatoshi et al., "Verification of 380 Vdc Distribution System Availability Based on Demonstration Test", NTT Facilities, Inc., IEEE Transactions on Power Electronics, Dec. 12, 2011, 6 pgs.
Baldwin, Mark, et al. "Higher Voltage DC (HVDC) Power Solutions for Critical Power Environments", Direct Power Technologies, Inc., Jan. 6, 2008, 67 pgs.
Bodi, Frank et al. "Criteria for Emerging Telecom and Data Center Powering Architectures", IEEE Transactions on Power Electronics, Sep.-Oct. 2012, 9 pgs.
Bodi, Frank et al., "380/400V DC Powering Option", IEEE Transactions on Power Electronics, Dec. 12, 2011, 8 pgs.

\* cited by examiner

SYSTEM FOR CONVERTING AC ELECTRICAL POWER TO DC ELECTRICAL POWER AND METHODS

TECHNICAL FIELD

The present disclosure relates generally to AC to DC power conversion, and more particularly to limiting input current harmonics in a power converter system including a rectifier having a multilevel converter.

BACKGROUND

The conversion of alternating current (AC) electrical power to direct current (DC) electrical power is used for many purposes throughout the world. High voltage electrical power transmission and distribution, low voltage household and consumer devices, and medium voltage tools, mobile and stationary machines, and various industrial applications are examples of where AC to DC conversion techniques are applied. The technology best suited for converting between AC and DC electrical power in any given application can vary for many reasons, and thus engineers are welcoming of innovative design and control strategies.

SUMMARY

A system for converting alternating current (AC) electrical power to direct current (DC) electrical power includes a rectifier having phase legs each with an AC input node, and a multilevel converter. The multilevel converter can be controlled to generate output voltage for compensating differences between voltage phase and current phase in AC electrical power supplied to the system so as to limit input current harmonics.

DETAILED DESCRIPTION OF ILLUSTRATIVE EMBODIMENTS

Figure 1:
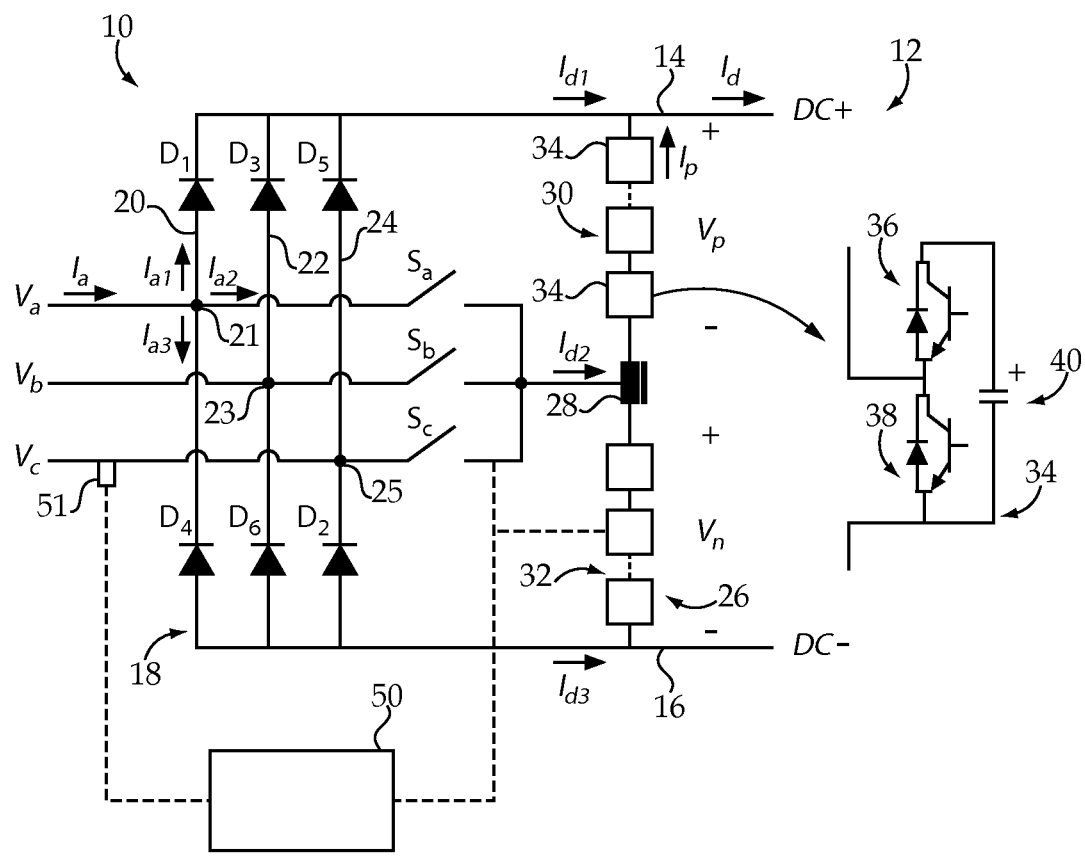
FIG. 1 is a diagrammatic illustration of a system, according to one embodiment.

For purposes of promoting an understanding of the principles of the System For Converting AC Electrical Power to DC Electrical Power and Methods, reference will now be made to the examples illustrated in the drawings, and specific language will be used to describe the same. It will nonetheless be understood that no limitation of the scope of the invention is intended by the illustration and description of certain examples of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, there is shown a system 10 for converting alternating current (AC) electrical power to direct current (DC) electrical power. System 10 includes a DC link 12 having a first DC rail 14, and a second DC rail 16. In the illustrated embodiment, first DC rail 14 includes a positive DC rail, whereas second DC rail 16 is of negative polarity. In a practical implementation strategy, DC link 12 will provide electrical communication terminals suitable for connecting with a DC load such as an electric motor, an actuator, or any of a great many other types of electrical loads. System 10 may be applied in medium voltage environments, for instance, in connection with industrial and manufacturing equipment and the like. While no specific definition of what constitutes "medium" voltage is intended by way of the present description, those skilled in the art will be familiar with certain distinctions among medium voltage applications, low voltage applications such as certain consumer goods, and high voltage applications such as electrical power distribution and transmission. Various power conditioning components, for example a capacitor, could be coupled between DC rails 14 and 16, at a location electrically between other components of system 10 yet to be described and the subject DC load. System 10 may further include a rectifier 18, such as a passive rectifier, coupled with DC link 12 and including a plurality of phase legs 20, 22, and 24, coupled with first and second DC rails 14 and 16 and a multilevel converter 26 also coupled with first and second DC rails 14 and 16. Each of phase legs 20, 22 and 24 may be structured to receive one phase of multiple phases of AC electrical power supplied to system 10, generally in a known manner. Applications where a phase number other than three is employed may still fall within the scope of the present disclosure. System 10 may further include a multilevel converter 26 coupled with DC link 12, a plurality of clamping switches $S_a$, $S_b$ and $S_c$, and a controller 50 operably coupled with multilevel converter 26 and also operably coupled with clamping switches $S_a$, $S_b$ and $S_c$. As will be further apparent from the following description, system 10 may be uniquely configured to convert AC electrical power to DC electrical power in a manner that is more efficient and otherwise advantageous over state of the art techniques.

Each of phase legs 20, 22 and 24 further includes an AC input node 21, 23 and 25, respectively. Each of phase legs 20, 22 and 24 further includes a first passive circuit element $D_1$, $D_3$ and $D_5$ connected between the corresponding AC input node and first DC rail 14, and a second passive circuit element $D_2$, $D_4$ and $D_6$ connected between the corresponding AC input node and second DC rail 16. In the illustrated embodiment, the plurality of phase legs includes a total of three phase legs, and the passive circuit elements include diodes arranged so as to form as 6-pulse bridge.

Multilevel converter 26 includes a middle node 28, a first active arm 30 coupled between middle node 28 and first DC rail 14, and a second active arm 32 coupled between middle node 28 and second DC rail 16. Multilevel converter 26 may further include within each of active arms 30 and 32 a plurality of cells 34. Each of cells 34 may include a first switch 36, a second switch 38, and an energy storage device 40 such as a capacitor. First switch 36, second switch 38, and capacitor 40 within each cell 34 may be arranged in a bridge configuration. In a practical implementation strategy, the bridge configuration is a half-bridge configuration, as shown in a detailed enlargement of one of cells 34 in FIG. 1. Also in a practical implementation strategy, each of first and second switches 36 and 38 may include a transistor switch, such as an insulated gate bipolar transistor (IGBT). In the diagrammatic illustration of FIG. 1, each of active arms 30 and 32 is shown having three cells 34 connected in series, although it should be appreciated that any number of cells 34 might be used, and possibly other connection configurations, without departing from the scope of the present disclosure.

Multilevel converter 26 is structured via active controlling of arms 30 and 32 to generate a voltage output to DC rails 14 and 16, to provide a stepped voltage waveform of a desired shape, and desired phase angle, relative to AC supply voltages, the significance of which will be further apparent from the following description. Those skilled in the art will appreciate the general manner in which switches in active multilevel converter arms can be operated to provide a voltage output having a waveform approximating a sine wave, or another waveform. In general terms, one of the two switches in each cell may be turned off, and the other turned on, to electrically connect the corresponding capacitor 40 with an input and output of the cell, making the capacitor charge available for supplying to one of the DC rails 14 and 16. By sequentially operating the switches in cells 34 in a direction from midpoint 28 toward the corresponding one of the DC rails 14 and 16, the capacitors 40 may be sequentially brought online, and then a reverse process undertaken to take the capacitors sequentially offline, providing an output voltage waveform that is stepped up and stepped down and approximates a sine wave. This control capability, and its exploitation to limit input current harmonics, is further discussed below.

Clamping switches $S_a$ $S_b$ and $S_c$ are each coupled between middle node 28 of multilevel converter 26 and respective ones of AC input nodes 21, 23 and 25 of phase legs 20, 22 and 24. System 10 further includes a controller 50 operably coupled with multilevel converter 26, and typically also operably coupled with switches $S_a$, $S_b$ and $S_c$ and structured to reduce input current harmonics to rectifier 18 via controllably varying voltage outputs of first and second active arms 30 and 32. Controllably varying the voltage outputs in the manner contemplated herein compensates for differences between voltage phase and current phase in AC electrical power supplied to system 10. Those skilled in the art will be familiar with the phenomenon of AC voltage phase being different from AC current phase, especially in public service or other large scale power systems. In other words, AC electrical power in any of the three phases supplied to system 10, depicted via reference letters $V_a$, $V_b$ and $V_c$, may have voltage and current out of phase with one another. The difference in phase angle between voltage and current has been observed to induce input current harmonics in many systems. As will also be readily understood by those skilled in the art, input current harmonics generally represent electrical energy that cannot be passed through an AC to DC converter system, or not in the usual or efficient manner. In this way, input current harmonics generally affect the overall efficiency of a converter system. Controller 50 may include any suitable programmable microprocessor, and is shown in control communication with switches $S_a$, $S_b$ and $S_c$. Controller 50 is also shown in control communication via one or more control lines (not numbered) with active arm 32, and it will be understood that controller 50 is also in control communication with active arm 30. System 10 may further include a phase monitoring mechanism 51, including any of a variety of suitable and commercially available voltage and/or current sensing mechanisms, coupled with each of the AC phase electrical power inputs to system 10 and structured to monitor voltage phase and current phase of the AC electrical power supplied, or at least the phase angle difference between voltage and current. Accordingly, controller 50 will be understood to interrogate, or receive signals from mechanism 52 indicative of a phase angle of input current and a phase angle of input voltage for electrical power in each of the three phases, or whatever number of phases are used, supplied to system 10. Based upon data obtained via mechanism 52, or data received via any other suitable means, controller 50 may determine an error between voltage phase angle and current phase angle in the AC electrical power supplied, and vary voltage outputs generated by each of active arms 30 and 32 responsive to the determined error. In a practical implementation strategy, the characteristic of voltage output of multilevel converter 30 that is varied may be a voltage phase angle, and in particular a voltage phase angle of a midpoint voltage in a voltage output having a waveform approximating a sine wave, as described herein.

Figure 2:
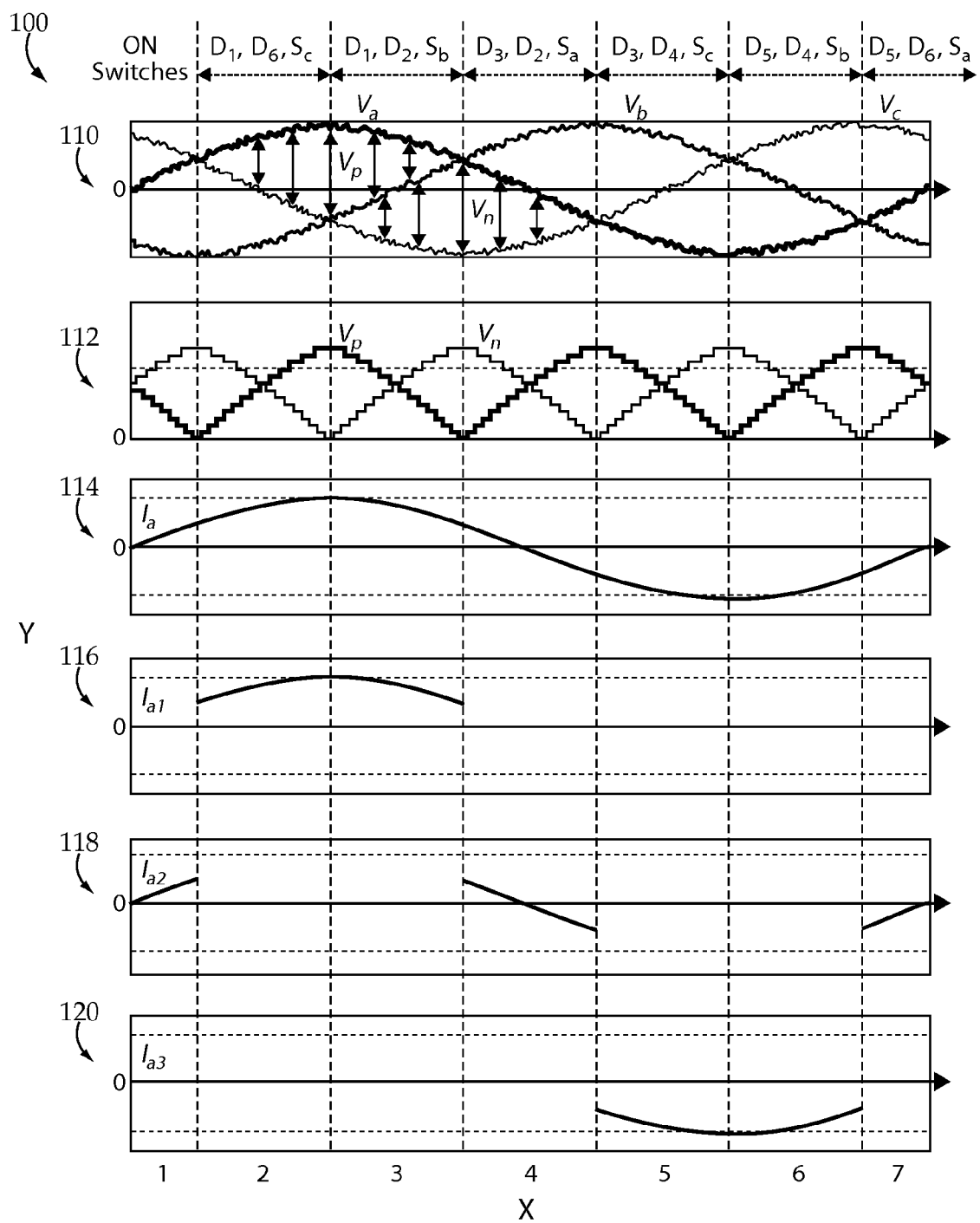
FIG. 2 is a graph illustrating operating principles of the system of FIG. 1.

Referring also now to FIG. 2, there is shown a graph 100 including a graphical representation of various properties of current and voltage in system 10 during operating system 10. At section 110 of graph 100, voltages for each of phases $V_a$, $V_b$ and $V_c$ are shown over a time interval corresponding to one fundamental cycle. At section 112, voltage output of arm 30 is shown via line $V_p$, and voltage output of arm 32 is shown via line $V_n$. At section 114, an input current from phase $V_a$ is shown, whereas sections 114, 116, 118, and 120 show how input current $I_a$ is distributed among and to different parts of system 10, with each of the current flows $I_{a1}$, $I_{a2}$, $I_{a3}$ being labeled also on FIG. 1. On the X-axis in graph 100 are shown a plurality of time intervals 1-7. Separating the time intervals are the voltage crossing points of the three phases of AC electrical power $V_a$, $V_b$ and $V_c$. At the top of graph 100, within each of intervals 1-7 can be seen the reference letters for the circuit elements that are "on" and conducting electrical current in that time interval. Thus, it can be seen that in time interval 2 circuit element or diode $D_1$ is connecting the phase with the highest voltage to the DC+ terminal or first DC rail 14. Circuit element or diode $D_6$ is connecting the phase with the lowest voltage to the DC− terminal, and clamping switch $S_c$ is closed to connect the phase with the medium voltage to midpoint 28.

In time interval 3, phase $V_a$ continues to be the highest voltage phase, and current flows via diode $D_1$ to first DC rail 14, but now phase $V_c$ has become the phase with the lowest voltage and thus diode $D_2$ connects phase $V_c$ to DC rail 16. Since phase $V_b$ now has the medium voltage in time interval 3, switch $S_b$ connects phase $V_b$ to midpoint 28. In can meanwhile be seen that current $I_{a1}$ flows through diode $D_1$ for time intervals 2 and 3. During time interval 1, phase $V_a$ is connected to midpoint 28, and it can thus be seen that current $I_{a2}$ would flow through switch $S_a$ to feed multilevel converter 26. The connections via switches $S_a$, $S_b$ or $S_c$ will change every one-sixth cycle at the zero crossings of line to line grid voltages in the illustrated embodiment. The line to line voltages behind impedance, seen from AC input nodes 21, 23 and 25 into rectifier 18, are defined by the two active arms 30 and 32. By synthesizing multilevel voltage waveforms according to $V_p$ and $V_a$ as shown in FIG. 2, the AC grid effectively sees three-phase sinusoidal voltages behind impedance at the AC input nodes, of rectifier 18. The input currents are generally sinusoidal.

Also depicted in FIG. 1 are DC-side currents $I_{d1}$, $I_{d2}$, $I_{d3}$, $I_p$ and $I_d$. It will generally be desirable to control AC input currents to be in phase with AC voltages so as to minimize reactive power Q=0, to ensure continuous DC side currents $I_{d1}$, $I_{d2}$ and $I_{d3}$ before and after each current commutation.

Before switch $S_a$ turns on to connect phase $V_a$ to midpoint 28, $I_{d2}$ is =L. After $S_b$ turns off and $S_a$ turns on, $I_{d2}=I_a$. To avoid overvoltage due to current stepping, this commutation should also happen at the crossing points of phase currents, thus current should be in phase with voltage. As noted above, additional circuit elements for smoothing the DC signal are not shown, but will commonly be used in connection with or as part of system 10. The DC output waveform conditioned via such circuit elements may be a 6-pulse DC waveform similar to a conventional rectifier.

Figure 3:
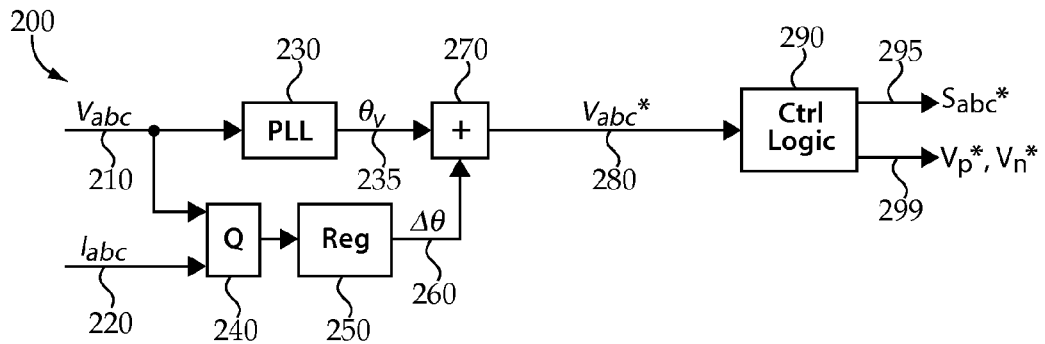
FIG. 3 is a block diagram illustrating a control loop, according to one embodiment.

It will be recalled that controller 50 is structured to reduce input current harmonics to rectifier 18 via the varying of voltage outputs of arms 30 and 32. It will further be recalled that the line to line voltage at AC input nodes 21, 23 and 25 is determined on the basis of the voltage output of active arms 30 and 32. Accordingly, the AC voltage phase present at the input nodes, or in other words seen by the input nodes is dependent upon the operation of arms 30 and 32, thus enabling phase angle of the voltage output of arms 30 and 32, and as discussed above the midpoint voltage phase angle, to compensate for the difference in phase angle that might exist between AC input current and AC input voltage. Controller 50 may perform this function in a closed loop manner in at least some embodiments. Referring now to FIG. 3, there is shown a control loop 200 where a voltage input 210 or $V_{abc}$ corresponding to voltage on one of phases $V_a$, $V_b$ or $V_c$, and a current input 220 or $I_{abc}$ corresponding to current input on the one of those phases, are received and a phase difference between voltage and current to determine reactive power Q computed at block 240. The phase difference is used to compute a change in phase term 260 or $\Delta\Theta$ in a control block 250. Meanwhile, the voltage input 210 is used in a phase locked loop at block 230 to compute an actual voltage phase angle 235 or $\Theta_v$. The actual voltage phase angle 235 and change in phase 260 are summed at block 270, to generate a control term 280 or $V_{abc*}$. This control term then serves as a basis in calculations according to control logic at block 290 to generate a switching signal 295 or $S_{abc*}$, which serves as a command in the form of a control signal output to midpoint switch $S_a$, $S_b$ or $S_c$, and also a command 299, $V_{p*}$ or $V_{n*}$, as the case may be, to one of arms 30 and 32 to provide a corrective voltage as described herein. The phase angle that results from the calculations in control loop 200 will be a phase angle that is different from the phase angle of either of the input voltage phase or the input current phase, in other words a corrective phase angle, and in successive iterations of the control loop may be closer to the current phase and voltage phase in the supplied AC electrical power as the phase error is reduced.

Figure 4:
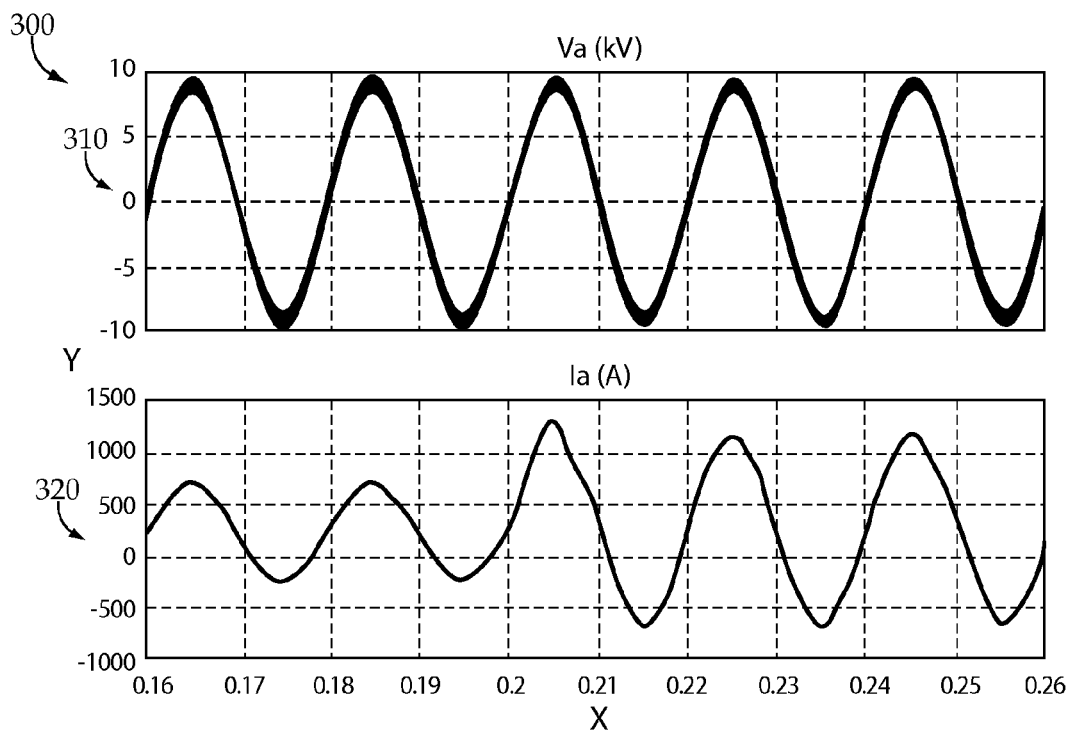
FIG. 4 is a graph illustrating input voltage and current waveforms during operation of the system of FIG. 1, according to one example scenario.

Referring now to FIG. 4, there are shown input voltage and input current waveforms, with magnitude and polarity shown on the Y-axis and time shown on the X-axis in a graph 300 in an example simulated implementation of the present disclosure. Reference numeral 310 identifies the voltage waveform, whereas reference numeral 320 identifies the current waveform. In the illustrated instance, a DC load step from about 50% to about 100% is applied at 0.2 seconds. Input current total harmonic distortion (THD) is about 2.9%, mainly fifth harmonics. The harmonic content is considered likely due to cell capacitor voltage variation in arms 30 and 32. FIG. 4 thus illustrates an instance where closed loop control according to the control strategy set forth herein is used to regulate reactive power via the adjustment of the phase angle of midpoint voltages output by arms 30 and 32, demonstrating a relatively low level of THD.

Figure 5:
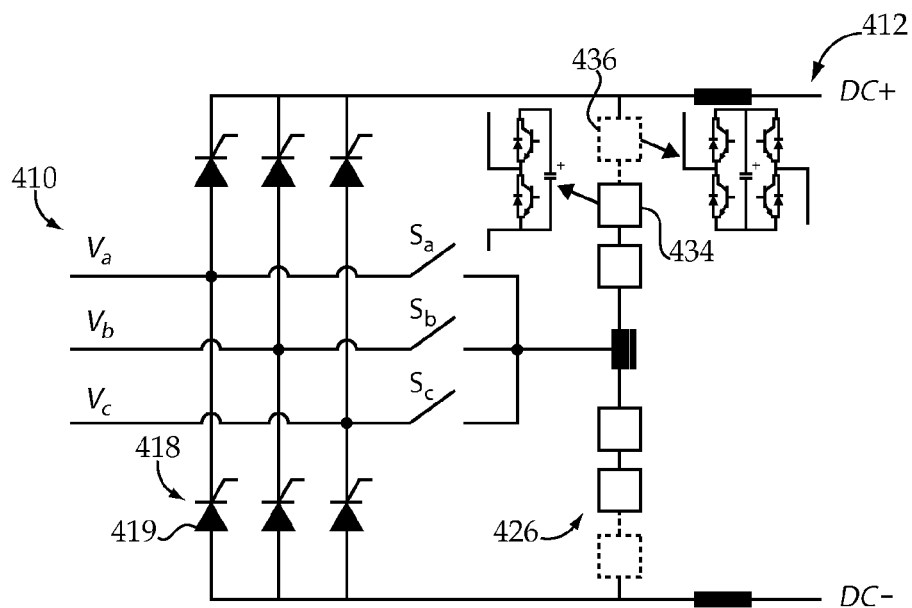
FIG. 5 is a diagrammatic illustration of a system, according to another embodiment.

Referring now to FIG. 5, there is shown a system 410 according to another embodiment, and including a similar topology and components to system 10 discussed above, including a rectifier 418, a multilevel converter 426, and a DC link 412. System 410 is adapted for fault current blocking capability to DC short circuit faults, and in contrast to system 10 and its use of a diode bridge, system 410 employs a thyristor bridge, where thyristors 419 are used in place of diodes. In multilevel converter 426 cells 434, similar or identical to cells used in system 10, are provided, and will be recognized to have a half-bridge configuration as in the detailed enlargement. One or more full bridge cells 436 may also be used, and enable accelerated suppression of a fault current.

Figure 6:
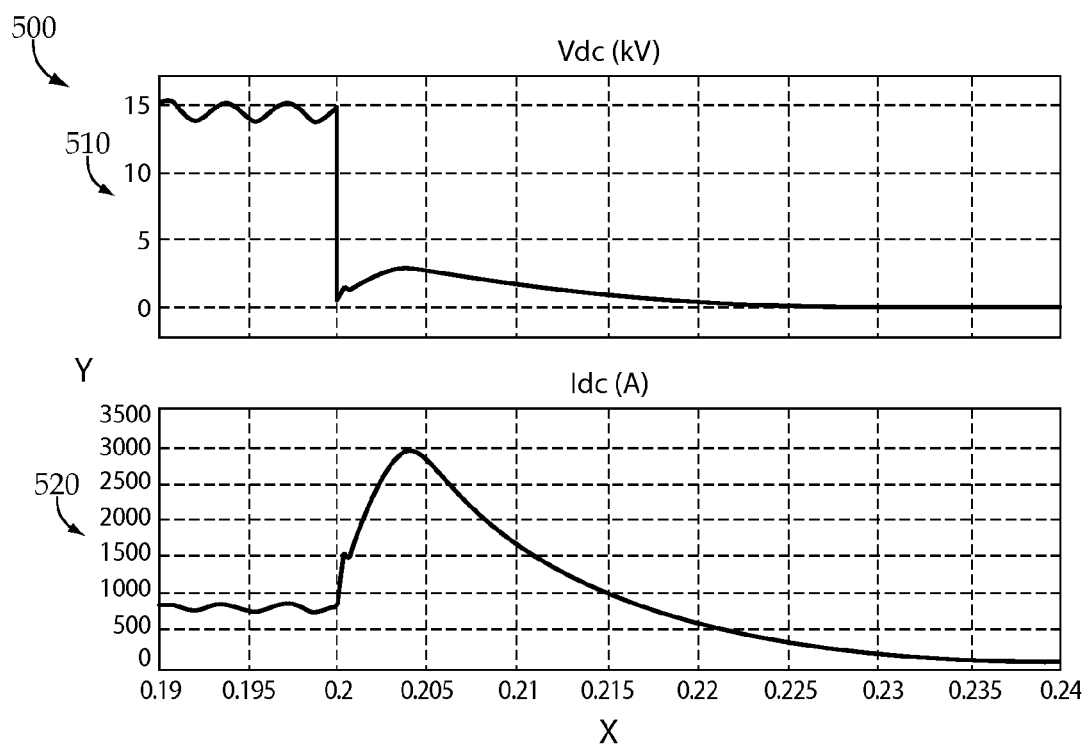
FIG. 6 is a graph of voltage and current during operation of the system of FIG. 5, according to one example scenario.

Referring also to FIG. 6, there is depicted DC fault current dynamics with a DC pole to pole fault occurring at 0.2 seconds. Graph 500 of FIG. 6 includes a first section 510 where the graph line represents DC voltage, and another section 520 where the graph line represents DC current. In the illustrated example, no full bridge cells are used, but could be in other embodiments. A total of 30% DC reactance is used to limit fault current rise. Fault resistance may be assumed to be one ohm. The active arms of converter 426 and midpoint clamping switches are blocked when overcurrent is detected. One of the legs of thyristors 419 may be gated ON to freewheel the fault current, to prevent the fault current from passing through the diodes in the arms of converter 426.

The present description is for illustrative purposes only and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A system for converting alternating current (AC) electrical power to direct current (DC) electrical power comprising:
    a DC link including a first DC rail;
    a second DC rail;
    a passive rectifier coupled with the DC link and including a plurality of phase legs coupled with the first and second DC rails, each of the phase legs having an AC input node, a first passive circuit element connected between the AC input node and the first DC rail, and a second passive circuit element connected between the AC input node and the second DC rail;
    a multilevel converter coupled with the DC link, and including a middle node, a first active arm coupled between the middle node and the first DC rail, and a second active arm coupled between the middle node and the second DC rail;
    a plurality of clamping switches each coupled between the middle node of the multilevel converter and respective ones of the AC input nodes of the plurality of phase legs; and
    a controller operably coupled with the multilevel converter and structured to reduce input current harmonics to the passive rectifier and to reduce input reactive power, via controllably varying voltage outputs of the first and second active arms so as to compensate for differences between voltage phase and current phase in AC electrical power supplied to the system.

2. The system of claim 1 wherein each of the active arms includes a plurality of cells each having an energy storage device and a first switch and a second switch arranged with the energy storage device in a bridge configuration.

3. The system of claim 2 wherein each of the energy storage devices includes a capacitor and each of the first and second switches includes a transistor switch, and wherein the bridge configuration includes a half-bridge configuration.

4. The system of claim 2 wherein the plurality of phase legs includes a total of three phase legs, and wherein the passive circuit elements include diodes arranged within the phase legs so as to form a 6-pulse bridge.

5. The system of claim 2 wherein the plurality of phase legs includes a total of three phase legs, and wherein the passive circuit elements include thyristors arranged within the phase legs so as to form a 6-pulse bridge.

6. The system of claim 1 wherein the varying of the voltage outputs includes adjusting a voltage phase angle so as to shift a voltage phase angle present at the AC input nodes.

7. The system of claim 6 wherein the adjusted voltage phase angle includes a midpoint voltage in a voltage output having a waveform approximating a sine wave.

8. The system of claim 1 wherein the controller is further structured to determine an error between voltage phase and current phase in AC electrical power supplied to the system, and to vary the voltage outputs responsive to the determined error.

9. A method of operating a system for converting alternating current (AC) electrical power to direct current (DC) electrical power comprising:
supplying AC electrical power having a difference in phase between voltage and current to the system;
generating a voltage output from a multilevel converter to a DC link in the system, responsive to the difference in phase;
inputting electrical current of the AC electrical power to an AC input node in a rectifier of the system that is coupled to the DC link; and
compensating for the difference in phase at the AC input node, via the voltage output of the multilevel converter, so as to limit harmonics in the inputted electrical current.

10. The method of claim 9 wherein generating a voltage output includes determining a phase angle of the voltage output responsive to the difference in phase.

11. The method of claim 10 wherein the phase angle includes a phase angle of a midpoint voltage in a stepped waveform approximating a sine wave.

12. The method of claim 11 wherein a phase angle of the supplied AC electrical power is shifted at the AC input node via the output voltage of the multilevel inverter.

13. The method of claim 9 wherein supplying AC electrical power includes supplying a first phase of AC electrical power to a first rail of the DC link, and further comprising supplying a second phase of AC electrical power to a second rail of the DC link, and supplying a third phase of AC electrical power to the multilevel converter.

14. The method of claim 13 wherein the first phase of AC electrical power has a higher voltage, the second phase has a lower voltage and the third phase has a medium voltage.

15. The method of claim 14 wherein the supplying of the first, second, and third phases occurs at an earlier time, and further comprising connecting the second phase to the multilevel converter in place of the third phase at a later time.

16. The method of claim 13 further comprising conveying a portion of the inputted electrical current from the AC input node to the first DC rail through a passive circuit element.

17. A method of limiting input current harmonics in a system for converting alternating current (AC) electrical power to direct current (DC) electrical power comprising:
monitoring a voltage phase and a current phase in AC electrical power supplied to the system;
determining an error based on a difference between the voltage phase and the current phase;
outputting control signals to a multilevel converter coupled to a DC link in the system responsive to the determined error; and
generating a voltage output from the multilevel converter to the DC link responsive to the control signals so as to reduce input current harmonics via compensating for the difference in phase at an AC input node of a rectifier in the system.

18. The method of claim 17 wherein generating the voltage includes generating a voltage output having a phase angle at a midpoint voltage that is dependent upon the determined error.

19. The method of claim 18 wherein the determined error is an error at an earlier time, and further comprising determining a reduced error at a later time and generating another voltage output responsive to the reduced error.

20. A rectifier for converting alternating current (AC) electrical power to direct current (DC) electrical power comprising:
a first DC rail;
a second DC rail;
a plurality of phase legs coupled with the first and second DC rails and each having an AC input node;
a multilevel converter including a middle node, a first active arm coupled between the middle node and the first DC rail, and a second active arm coupled between the middle node and the second DC rail;
a plurality of clamping switches each coupled between the middle node of the multilevel converter and respective ones of the AC input nodes of the plurality of phase legs;
a phase monitoring mechanism structured to monitor a voltage phase and a current phase in AC electrical power supplied to the converter; and
a controller operably coupled with the multilevel converter and structured to reduce input current harmonics via controllably varying voltage outputs of the first and second active arms so as to compensate for differences between voltage phase and current phase in AC electrical power supplied to the rectifier.

\* \* \* \* \*